United States Patent [19]

Dobos

[11] Patent Number: 4,579,011

[45] Date of Patent: Apr. 1, 1986

[54] PROPULSION APPARATUS

[76] Inventor: Elmer M. Dobos, 1003 Celeron Ave., Pittsburgh, Pa. 15216

[21] Appl. No.: 619,331

[22] Filed: Jun. 11, 1984

[51] Int. Cl.[4] .............................................. F03G 7/08
[52] U.S. Cl. ...................................... 74/84 R; 74/61; 74/87
[58] Field of Search ................. 74/61, 84 R, 84 S, 87, 74/568 R; 366/128

[56] References Cited

U.S. PATENT DOCUMENTS

| | | | |
|---|---|---|---|
| 1,953,964 | 4/1934 | Laskowitz | 74/84 R |
| 2,009,780 | 7/1935 | Laskowitz | 74/61 |
| 2,886,976 | 5/1959 | Dean | 74/112 |
| 3,433,311 | 3/1969 | Lebelle | 173/49 |
| 3,555,915 | 1/1971 | Young, Jr. | 74/84 S |
| 3,583,497 | 6/1971 | Kossowski | 74/61 X |
| 3,584,515 | 6/1971 | Matyas | 74/84 R |
| 3,653,269 | 4/1972 | Foster | 74/84 S |
| 3,683,708 | 8/1972 | Dwyer | 74/84 R |
| 3,756,086 | 9/1973 | McAlister et al. | 74/84 S |
| 3,863,510 | 2/1975 | Benson | 74/64 |
| 3,897,692 | 8/1975 | Lehberger | 74/84 S |
| 3,916,704 | 11/1975 | Gaberson | 74/84 R |
| 3,968,700 | 7/1976 | Cuff | 74/84 S |
| 3,998,107 | 12/1976 | Cuff | 74/84 S |
| 4,095,460 | 6/1978 | Cuff | 74/84 S |

FOREIGN PATENT DOCUMENTS 2062188  5/1981  United Kingdom ................ 74/84 S

OTHER PUBLICATIONS

"The Controversial Dean System Space Drive", by Charles D. Lafond, *Missiles and Rockets*, May 1, 1961.
"Brasstacks", letter to editor written by Norman L. Dean, published in *Analog Science Fact–Science Fiction* (date unknown).

Primary Examiner—Allan D. Herrmann
Attorney, Agent, or Firm—Stanley J. Price, Jr.

[57] ABSTRACT

A platform supports a shaft assembly that extends upwardly in a direction perpendicular to the horizontal plane of the platform and through a disk mounted for rotation on the shaft assembly above the platform. The disk is rotated at a preselected speed and carries on the circumferential edge portion thereof a plurality of liquid filled reservoirs spaced from one another completely around the circumference of the disk. Buoyantly positioned in each reservoir is a hollow piston having a piston rod extending outwardly from the reservoir. Mounted on the shaft assembly is an adjustably movable cam having a cam track eccentrically positioned with respect to the axis of the shaft assembly. The piston rod end portions are positioned oppositely of the cam track for movement into and out of contact with the cam track upon rotation of the disk which carries the reservoirs. A load head applies a force downwardly upon a bent flexible shaft which engages a shoulder on the maximum radial sector of the cam to move the cam to a preselected position for displacement of the pistons in the reservoirs as the disk rotates about the cam. The relative displacement of the liquid in the reservoirs by the movement of the pistons in response to the contact of the piston rods with the cam track creates an unbalanced centrifugal force for movement of the platform in a preselected linear direction.

10 Claims, 4 Drawing Figures

PROPULSION APPARATUS

BACKGROUND OF THE INVENTION

1. Field of the Invention

This invention relates to propulsion apparatus and more particularly to apparatus for converting rotary motion to unidirectional motion.

2. Description of the Prior Art

Systems for converting rotary motion into unidirectional thrust are well known in the art as disclosed in U.S. Pat. Nos. 2,886,976; 3,584,515; 3,968,700; 3,998,107; and 4,095,460. U.S. Pat. No. 2,886,976 discloses the well known "Dean Space Drive" which utilizes oppositely rotating pairs of eccentric inertia masses in a freely suspended system which converts movements provided by a prime mover into either intermittent propulsive pulses or continuous thrust in one direction. When a load is imposed on a system in a central direction so that movement in one direction will act on and move the load, lift or thrust is generated.

In operation of the "Dean Space Drive", a pair of eccentric counterrotating inertial masses are fixed on parallel drive shafts. Primary rotary power is mechanically connected to one, and the other shaft is driven by gears. A frame supporting the two eccentric masses is supported above and below with adjustable springs. The frame is freely suspended in one plane in an outer frame. Rollers, wheels or bearings permit minimal friction between the two frames. A pair of solenoids return the movable frame to the center position during each oscillation and provide damping. A steel tape operates as the load mechanism, and during each positive position of an oscillation it is advanced by an engaged electromagnetic clutch. The solenoid and magnetic clutch are activated in timed relation. The rigid connection between paired shafts and the counter-rotation of the masses produces a concellation of forces and reactions engendered in all directions except in the direction of the desired oscillation. This is always parallel to a plane perpendicular to the axes of rotation of the two masses.

The cancellation of the forces produces an oscillation by the resultant forces which represent the sum of the components of all forces acting in the direction of a plane at right angles to the shaft axes. The generated unidirectional force is transmitted to a load or can act on the carrier itself.

U.S. Pat. No. 3,998,107 discloses a device that converts rotary motion into unidirectional motion by varying the radius or gyration of a plurality of gyrating masses which gyrate in a plane that is perpendicular to the axis of rotation. A rotating drive shaft generates rotation of a support structure and gyrating masses. The axis of the displaced crank segment of the crank-like shaft does not coincide with the axis of rotation of the gyrating masses. Consequently, the radial distance of each gyrating mass varies from some minimum distance to some maximum distance. This results in a variation of the centrifugal force produced by each gyrating mass. The angular position of the cranklike shaft determines the position where the gyrating masses attain the maximum and minimum radial distances.

U.S. Pat. No. 3,584,515 discloses a system for varying the radius of gyration of a plurality of masses as they pass through a predetermined sector of the path of rotation. Consequently an unbalanced centrifugal force propels a frame in a direction which depends on the application of the sector at which the unbalance occurs. Compressed air is utilized to effect movement of the pistons and the associated liquid masses. The control means for effecting movement of the pistons at a particular point in their rotational travel about the axes to create the unbalanced centrifugal force includes switches actuated by a knob to energize gate valves to, in turn, energize solenoids associated with the operation of the switches.

U.S. Pat. Nos. 3,968,700 and 4,095,460 also disclose devices for converting rotary motion to unidirectional motion by varying the radius of gyration of a plurality of masses. The direction of the unbalanced force is selectively changed by the orientation of a pair of cams.

While it is known to convert rotary motion into unidirectional linear motion, the prior art devices rely upon the displacement of a plurality of rotating masses in which the masses are oscillated toward and away from the axis of rotation between a maximum radial distance and a minimum radial distance relative to the axis of rotation. Consequently, unbalanced centrifugal force is generated in a preselected direction, and the direction of the unbalanced centrifugal force is selective. These known devices require complex support and action/reaction construction to generate movement of the rotating masses so that the radius of gyration of each of the masses is constantly changing as the masses pass through a predetermined sector of a path of rotation.

Therefore, there is a need for a propulsion system that converts rotary motion to unidirectional motion to generate an unbalanced centrifugal force without a complicated arrangement of varying the radius of gyration of masses positioned on the circumference of a rotating frame.

SUMMARY OF THE INVENTION

In accordance with the present invention there is provided apparatus for converting rotary motion to unidirectional motion that includes a platform and a shaft having an axis extending perpendicular to the plane of the platform. A rotatably driven disk is mounted on the shaft below the platform. The disk has a circumferential edge portion. A plurality of reservoirs containing liquid are secured to the disk circumferential edge portion. The reservoirs are equally spaced one from another around the disk circumferential edge portion. A piston is buoyantly supported in each reservoir and includes a piston rod. Each piston rod includes an end portion extending from the respective reservoir in a plane perpendicular to the axis of the shaft. A cam surrounds the shaft above the platform. The cam has a cam track eccentrically positioned with respect to the axis of the shaft. The piston rod end portions are positioned oppositely of the cam track for movement into and out of contact with the cam track upon rotation of the disk about the shaft. Means is provided for supporting the cam on the platform for slidable movement in a plane perpendicular to the axis of the shaft. A load head is positioned above the cam concentric with the axis of the shaft and is supported by the platform. Load transmitting means extending from the load head in contact with the cam exerts a constant force upon the cam in a preselected direction to selectively position the cam on the platform. The piston rods being contacted by the cam track upon rotation of the disk move the piston rods inwardly and outwardly of the reservoirs to move the pistons to displace the fluid in the reservoirs and generate an unbalanced centrifugal force upon the platform in said preselected direction.

The cam has a maximum radius and a minimum radius. Positioned on the maximum radius adjacent the cam track is a peripheral sector forming an abutment shoulder for receiving the force transmitted by the load head to the load transmitting means. In one embodiment the load transmitting means includes a flexible shaft connected to the load head and extending down and through the shaft that supports the rotatable disk. One end of the flexible shaft extends perpendicular to the shaft that supports the disk and is positioned in abutting relation with the peripheral sector of the cam which is located on the maximum radius of the cam. The opposite end portion of the flexible shaft extends through the shaft that supports the rotatable disk and is in contact with the load head. The load head, in one embodiment, includes a housing enclosing a compressed spring acting on a bearing surface in contact with the upper end of the flexible shaft so as to apply a constant force upon the upper end portion of the flexible shaft. The force is transmitted to the opposite end upon the peripheral sector of the cam. This force acting against the cam slides the cam in the direction of the maximum radius to the preselected position in which the direction of the unbalanced centrifugal force is applied.

In another embodiment the load head includes a set of stacked weights which can be utilized to apply a predetermined force upon the flexible shaft for displacing the cam on the surface of the platform to a preselected position corresponding to the point at which each piston rod is displaced for maximum displacement of the pistons in the liquid reservoir. As the disk carrying the reservoirs rotates, the piston rods are oscillated inwardly and outwardly so that upon one complete revolution of the cam the piston rods move from a position out of contact with the cam track and substantially fully extended out of the reservoirs to a position where the piston rod is retracted to a final position in the reservoir. Thus during each cycle of rotation of the cam, each piston rod moves into and out of the reservoir to reciprocate the piston head to thereby displace the fluid in the reservoir for generating the unbalanced centrifugal force on the platform.

The cam is supported by rollers on the upper surface of the platform and is thus movable to a preselected position relative to the circumferential edge portion of the disk that carries the reservoirs in order to select the direction of the unbalanced force which is generated by the displacement of the fluid in the reservoirs by the oscillatory reciprocal movement of the pistons as the ends of the piston rods follow the cam track of the cam. With this arrangement the load head applies constant pressure upon the slidable cam to obtain the desired displacement of the pistons in the reservoirs. The piston rods and pistons are light in weight and preferably hollow in order to obtain maximum efficiency. Transmission of the force from the load head to the peripheral sector of the cam and therefrom to the piston rods displaces the fluid in the reservoirs.

Accordingly, the principal object of the present invention is to provide a propulsion system that converts rotary motion into unidirectional motion by displacement of fluid in sealed containers which are fixed on the circumferential edge of a rotating body to create an unbalanced centrifugal force.

Another object of the present invention is to provide in a propulsion system a plurality of circumferentially spaced rotating bodies of liquid in which the liquid in the bodies is displaced in an oscillatory manner by pistons buoyantly supported in the bodies as the bodies rotate about an axis.

A further object of the present invention is to provide in a propulsion system that converts a rotary motion to unidirectional motion a load head for applying through a flexible shaft a preselected force upon an adjustably positioned cam to move the cam to a position for engaging a plurality of rotating liquid vessels spaced on the circumference of a disk so as to displace the fluid and generate an unbalanced centrifugal force.

These and other objects of the present invention will be more completely disclosed and described in the following specification, the accompanying drawings, and the appended claims.

DESCRIPTION OF THE PREFERRED EMBODIMENTS

Figure 1:
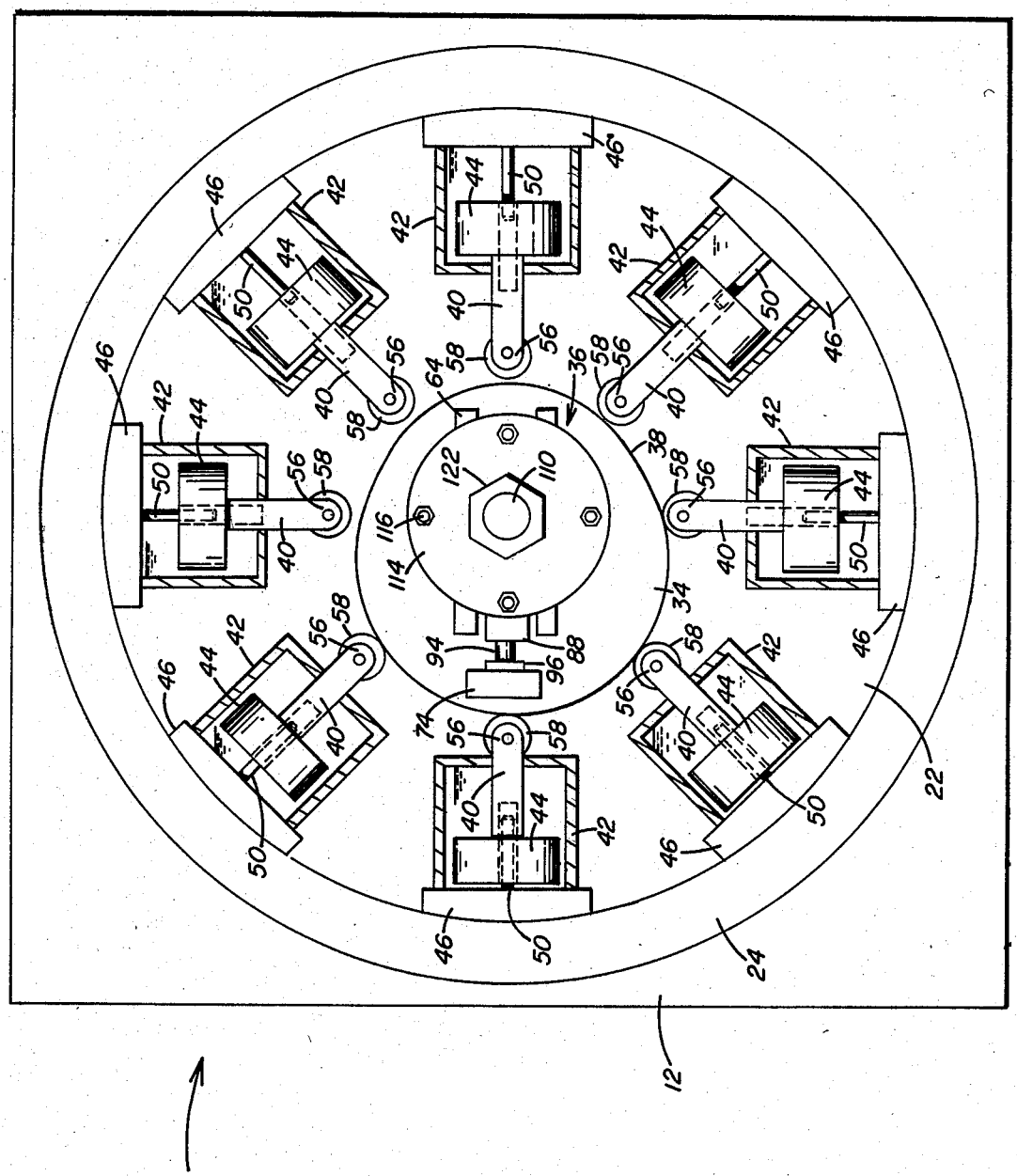
FIG. 1 is a top plan view of apparatus for converting rotational motion to unidirectional motion, illustrating a plurality of liquid vessels secured to the circumferential edge of a disk and containing reciprocal pistons and piston rods to displace the liquid.
Figure 2:
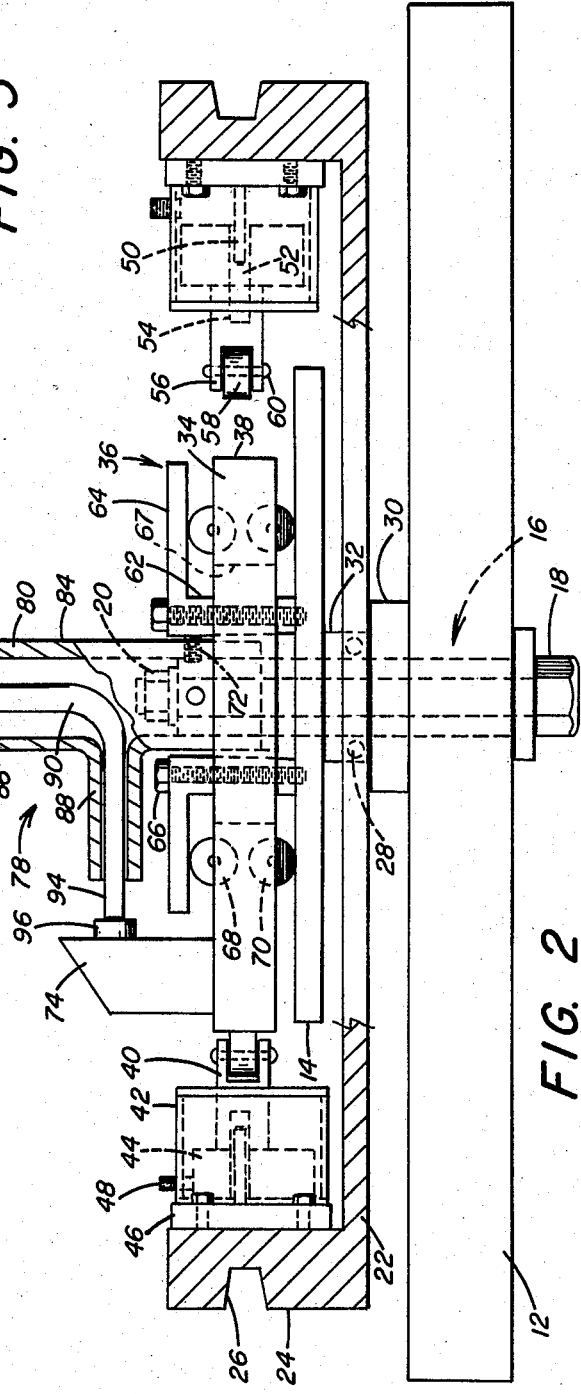
FIG. 2 is a partial sectional view in side elevation of the apparatus shown in FIG. 1.

Referring to the drawings and particularly to FIGS. 1 and 2, there is illustrated a propulsion system generally designated by the numeral 10 that includes a platform comprising a lower plate 12 and an upper plate 14 positioned in spaced overlying relation in a plane perpendicular to the axis of a shaft assembly generally designated by the numeral 16. The shaft assembly 16 includes a pair of longitudinally interconnected shafts 18 and 20. Shaft 20 is advanced into threaded enjoyment with shaft 18 in an internally threaded bore of shaft 18 until the head of the shaft 20 abuts the end of shaft 18. Spaced between the plates 12 and 14 is a rotatably driven disk 22 having an upwardly extending circumferential edge portion 24. The edge portion 24 has a V groove 26 for receiving a belt or any other suitable means for transmitting rotation to the disk 22. The disk 22 is rotatably supported by bearings 28 on the shaft assembly 16. The disk 22 is maintained in a preselected axial position on the shaft assembly 16 by a pair of bushings 30 and 32 which separate the disk 22 from the lower plate 12 and the upper plate 14. With this arrangement the disk 22 rotates about the axis of the shaft assembly 16 which remains stationary.

A cam 34 is adjustably positioned for lateral movement on the upper plate 14 in surrounding relation with the shaft assembly 16. The cam 34 is maintained in a plane perpendicular to the axis of the shaft assembly 16 by a guide mechanism generally designated by the numeral 36. The cam 34 includes a cam track 38. The cam 34 is maintained in a preselected position by the guide mechanism 36 to receive on the cam track 38 the ends of a plurality of piston rods 40 that extend into a corresponding plurality of liquid containing vessels or reservoirs 42 for connection to pistons 44 which are buoyantly supported in the respective reservoirs 42. The reservoirs 42 are connected to the disk edge portion 24 by plates 46 which are bolted to the disk edge portion 24.

Each reservoir 42 is substantially filled with a suitable liquid, such as water, oil, a slush, or other various viscous materials. Each of the pistons 44 is buoyantly supported or floats in the liquid filled reservoirs 42. As seen in FIG. 1, the reservoirs 42 are equally spaced from one another around the complete circumference of the disk edge portion 24. The reservoirs 42 include a filler cap 48. The piston rods 40 extend through the outer wall of the reservoirs 42 and are reciprocally supported by the liquid in the reservoirs 42. A conventional dynamic-type seal surrounds each opening in the reservoir 42 through which each piston rod 40 extends to prevent the liquid in each reservoir 42 from escaping out of the reservoir 42 as the respective piston rod 40 reciprocates out of and into the reservoir 42. The piston rods 40 and pistons 44 are maintained movable in a plane perpendicular to the axis of the shaft assembly 16 by a guide pin 50 which is received in an aligned slot 52 in the piston 44 and slot 54 in the piston rod 40. The pin 50 is connected to and extends outwardly from the wall of the reservoir 42 mounted on the plate 46.

Each of the piston rods 40 includes a bifurcated end portion 56. A roller 58 is rotatably positioned in the bifurcated end portion 56 by a pin 60. The rollers 58 are operable to engage the cam track 38 as the disk 22 is rotated about the shaft 16. As the disk 22 rotates, the rollers 58 are contacted by the cam track 38. Depending upon the position of the cam 34 on the upper platform 14, the rollers 58 engage the rotating cam track 38 to initiate reciprocal movement of the piston rods 40 into and out of the reservoirs 42. The movement of the piston rods 40, as well as the pistons 44, is maintained in a plane perpendicular to the vertical axis of the shaft assembly 16 by the guide pins 50 received in the slots 52 and 54.

The reciprocal movement of the rods 40 is transmitted to the pistons 44 to displace in a reciprocal manner the pistons 44 in the liquid filled reservoirs 42. Accordingly, movement of the pistons 44 in the reservoirs 42 displaces the liquid contained in the reservoirs 42. With this arrangement, an open system is provided as opposed to a closed system utilized by the above discussed prior art devices.

The range of movement of the piston rods 40 and the pistons 44 determines the displacement of the liquid. The relative adjustable system of the cam 34 on the upper plate 14 determines the range of movement of the piston rods 40 and pistons 44 by contact with the rotating cam track 38. The cam 34 is conventional in design and includes a maximum radius and a minimum radius with respect to the axis of the shaft assembly 16. The cam track 38 therefore is eccentrically positioned with respect to the shaft 16. At the point where the rotating piston rods 40 engage the maximum radius sector of the cam 34, the pistons 44 are fully retracted within the reservoirs 42, as illustrated in FIG. 2. On the other hand, when the piston rods 40 are positioned oppositely of the minimum radius sector of the cam 34, the piston rods 40 are removed from contact with the cam track 38 and the piston rods 40 are fully extended from the reservoirs 42, as also shown in FIG. 2. Thus the range of travel of the piston rods 40 and the displacement of the pistons 44 in the reservoirs 42 extends from the two positions illustrated in FIG. 2, and is determined by the position of the cam 34 on the upper plate 14.

The relative displacement of the pistons 44 in the reservoirs 42 is controlled by the eccentric position of the cam 34 on the shaft 16. As discussed above the cam 34 is slidably movable on the upper surface of the plate 14. The guide mechanism 36 facilitates the slidable movement of the cam 34. The guide mechanism 26, as shown in FIG. 2, includes a tubular member having a shaft portion 62 with a pair of spaced upper flange portions 64. The tubular member 62 is secured by bolts 66 extending through a slot 67 in the cam 34 to the plate 14. The cam 34 carries an upper pair of rollers 68 engageable with the flange portions 64 and a lower pair of rollers 77 engageable with the upper plate 14.

The tubular guide mechanism 36 includes an enlarged internal bore and is secured to the shaft assembly 16 by screw 72. With this arrangement cam 34 is movable laterally relative to the vertical axis of shaft assembly 16. The roller pairs 68 and 70 facilitate lateral adjustments of the cam 34 on the platform 14.

With the cam 34 located in the desired position on the plate 14 in a position where the maximum radial sector of the cam 34 is positioned in the desired direction of the unbalanced force, a preselected load is applied to the cam 34. An enlarged shoulder 74, as shown in FIGS. 1 and 2, is secured to and extends upwardly from the maximum radial sector of the cam 34. A load head generally designated by the numeral 76 applies a constant force to the enlarged shoulder 74. The load head 76 includes a load transmitting mechanism for coupling the load head 76 to the cam shoulder 74.

The load transmitting head 76 includes a tubular member 80 having an enlarged diameter cup shaped receiver 82 and a shaft support 84 communicating with the receiver 82 through the opening 86. The receiver 82 and the shaft support 84 are concentrically mounted on the upper end of the shaft 16. The guide mechanism 36 surrounds the lower end portion of the tubular support 84 on the cam 34. Projecting laterally and outwardly perpendicular to the shaft portion 84 is a tubular extension 88 that communicates with the internal bore of the shaft support 84.

Projecting laterally and outwardly perpendicular from the shaft support 84 is a tubular extension 88 that communicates with the internal bore of the shaft support 84. As illustrated in FIGS. 1 and 2, the tubular extension 88 is positioned oppositely of the cam shoulder 74. A L-shaped, flexible shaft 90 extends downwardly from an upper end portion 92 in the receiver 82 into the tubular shaft support 84 and therefrom at a 90 degree angle through the tubular extension 88 to a lower end portion 94. The shaft lower end portion 94 extends out of the tubular extension 88. An abutment shoulder portion 94 engages the cam shoulder 74. An enlarged shoulder 98 is positioned at the shaft upper end portion 92.

The tubular receiver 82 of the load transmitting mechanism 78 houses a compression spring 100 having a lower end portion 102 in contact with a bearing plate 104 positioned on the shoulder 98 of the shaft upper end portion 92. An upper end portion 106 of the spring 100 abuts against a piston head 108 carried on the end of a threaded shaft 110. The threaded shaft 110 extends through a threaded bore 112 in a guide cap 114 that is secured by bolts 116 to upper flanged edge 118 of the receiver 82. Extending downwardly from the guide cap 114 through the spring 100 is a circular spring support 120 with this arrangement in the spring 100 surrounds the circular spring support 120.

The spring 100 is axially retained with respect to the flexible shaft upper end portion 92 within the receiver 82 between the wall of the receiver 82 and the outer surface of the spring support 120. In this position the spring 100 is compressed between the piston head 108 and the bearing plate 104 on the upper end portion of the flexible shaft 92. The degree of compression of the spring 100 is adjusted by adjusting the position of the piston head 108 in the receiver 82. The threaded shaft 110 includes a hex end portion 122 which is rotated to advance the piston head 108 to a desired position within the receiver 82. When the piston head 108 is positioned to apply the desired compression upon the spring 100, the position of the threaded shaft 110 is fixed by tightening jam nuts 124 and 126 on the threaded shaft 110 contact with the guide cap 114.

Compression of the spring 100, as determined by the load applied to the spring 100, applies a downward force on the upper end portion 92 of the flexible shaft 90. This force is transmitted from the load head 76 through the flexible shaft 90 to the flexible shaft end portion 94 and against the cam shoulder 74. The magnitude of the force applied to the flexible shaft 90 by the load head 76 determines the amount of extension of the shaft end portion 94 from the tubular extension 88. Thus, the shaft end portion 94 is extended into contact with the cam track 38 to apply a force upon the cam shoulder 74 and laterally move the cam 34 on the upper plate 14 to locate the cam track 38 at a preselected position relative to the piston rods 40 in the reservoirs 42 on the rotation disk 22.

Accordingly, the relative position of the cam 34 on the platform 14 determines the length of travel of the piston rods 40 and the displacement of the pistons 44 in the reservoirs 42 as the disk 22 rotates to move the rollers 58 move into and out of contact with the cam track 38. The constant pressure applied by the load head 76 upon the cam 34 is directed on the maximum radius of the cam 34. Accordingly, the cam 34 is initially positioned on the upper plate 14 for aligning the maximum radius of the cam 34 in the desired direction of the unbalanced force. With this arrangement an open system is provided where the weight of the load transmitting mechanism 78 is caused by the flexible shaft 90 This force is transmitted by cam action to the liquid filled reservoirs 42.

A centrifugal force is created by the displacement of the hollow pistons 44 in the liquid reservoirs 42 by the reciprocal movement of the piston rods 40 upon rotation of the disk 22 relative to the fixed cam track 34. With this arrangement it is not necessary to rotate the cam 34. A further advantage is achieved by supporting the masses, that generate the centrifugal force, separately from the cam 34. The centrifugal force is generated by the displacement of the liquid in the reservoirs 42 in response to the movement of the piston rods 40 on the cam track 34. Thus, greater efficiency is gained by removing the masses from the cam 34.

An unbalanced centrifugal force is generated by the relative displacement of each of the pistons 44 in the reservoirs 42. Thus, the rotational movement of the disk 22 is converted to unidirectional movement to the plates 12 and 14 which form the supporting frame for the propulsion system 10. The generated unidirectional movement extends from the point of maximum displacement of the pistons 44 in the reservoirs 42.

An unbalance in centrifugal force is created by the reservoirs 42 passing from the point of minimum displacement of the pistons 44 in the reservoirs to the point of maximum displacement of the pistons 44 in the reservoirs 42. The maximum displacement of the pistons 44 occurs on the maximum radial sector of the cam 34 where the cam shoulder 74 is located. Accordingly, the range of displacement of the pistons 44 and the magnitude of the unbalanced centrifugal force is controllable by adjusting the position of the cam 34 on the upper plate 14 which is responsive to the downward force applied to shaft 40 by the load transmitting mechanism 78.

Figure 3:
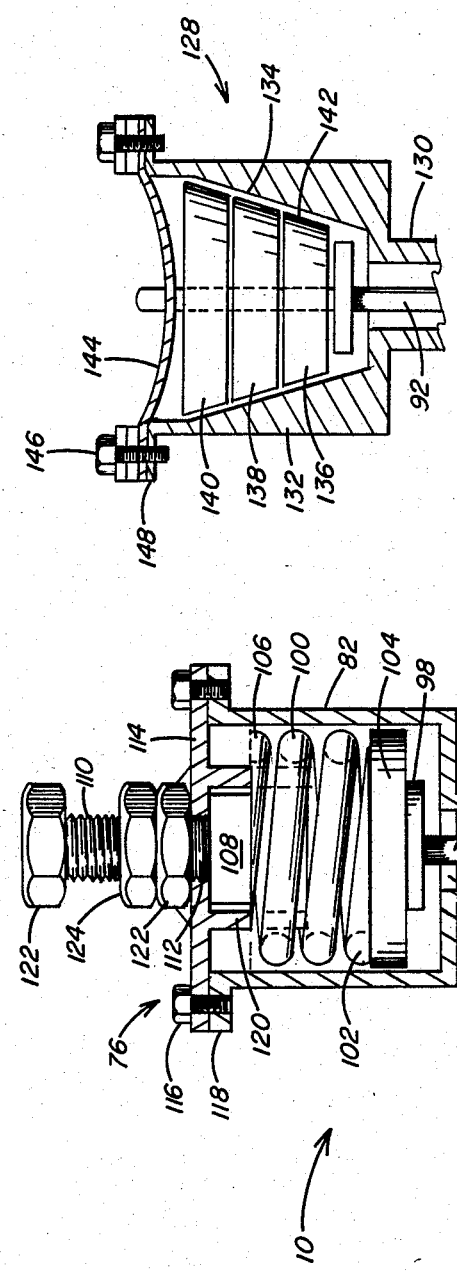
FIG. 3 is a fragmentary sectional view of another embodiment of the load head adaptable for use with the apparatus shown in FIGS. 1 and 2.

An alternative to the load head 76 illustrated in FIG. 2 is an arrangement of stacked weights provided by a load head 128, illustrated in FIG. 3. The load head 128 includes a tubular member 130, similar to the tubular member 80, that extends downwardly around the flexible shaft upper end portion 92. The tubular portion 130 is supported in a manner identical to the above described tubular member 80 on the upper plate 14. The tubular member 130 supports a receiver 132 having a frustoconical internal chamber 134 for receiving a plurality of frustoconical plates 136, 138 and 140. Each of the plates 136-140 has a configuration corresponding to the configuration of the frustoconical chamber 134.

The shaft end portion 92 includes a support shoulder 142. The support shoulder 142 is threadedly engaged to the upper end of shaft portion 92 so as to be movable to a desired location on the shaft end portion 92. Thus by advancing the shoulder 142 upwardly toward the extreme end of the shaft 92, the weight of the respective plates 136-140 is added to the shoulder 142. With this arrangement the shoulder 142 is advanced to a first position to carry only the weight of plate 136. Further rotation of the shoulder 142 upwardly on the shaft end portion 92 adds the weight of plate 138 to the shaft 92. Accordingly, further upward movement of the shoulder 142 on the shaft end portion 92 adds the weight of the plate 140 to the flexible shaft 90. In this manner a variation in the amount of force that is applied to the cam shoulder 74 is obtained. As seen in FIG. 3 the upper end portion of the receiver 132 is closed by a cap 144 which is secured by bolts 146 to the upper flanged end portion 148 of the receiver 132.

Figure 4:
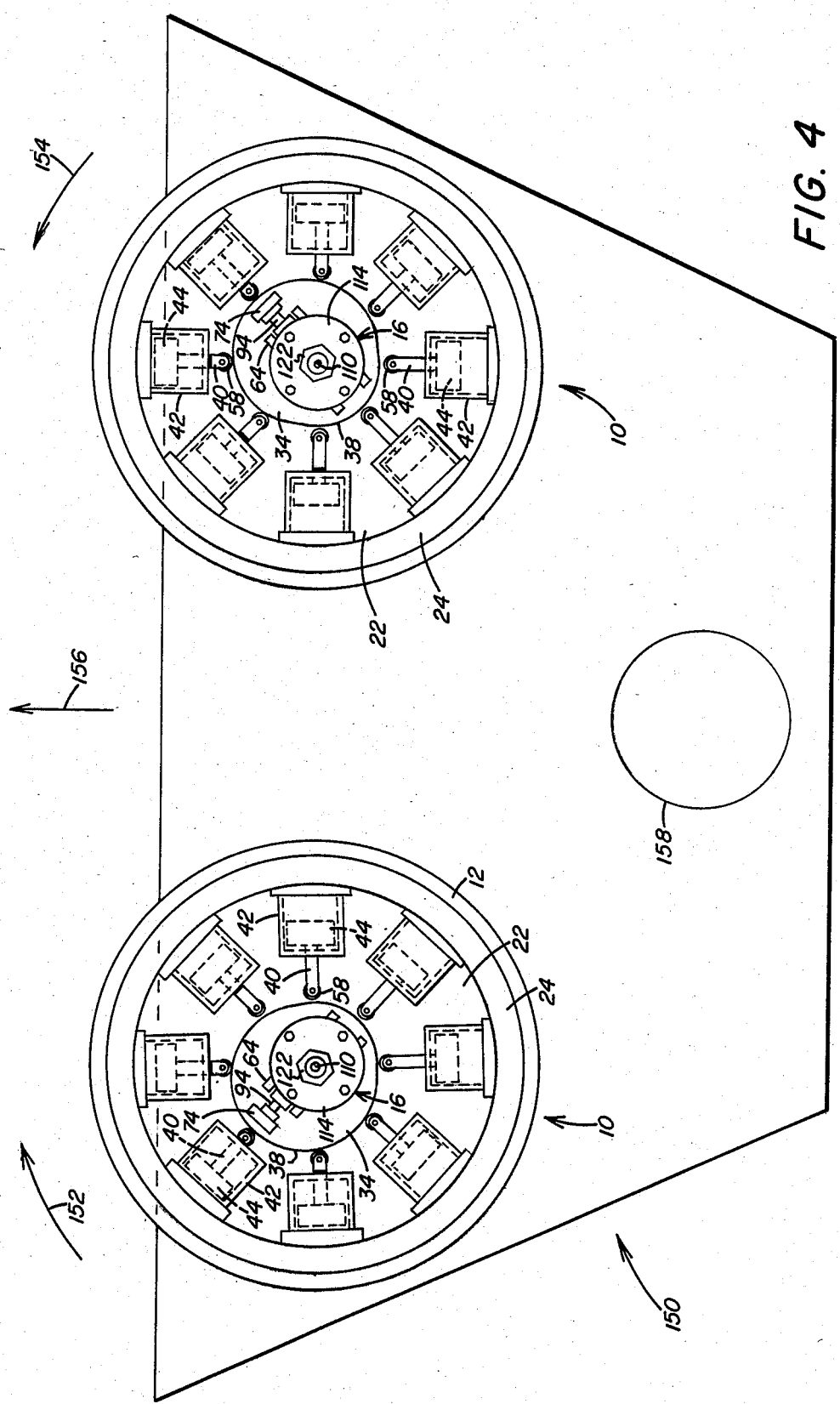
FIG. 4 is a schematic illustration of a propulsion system utilizing a pair of counter-rotating devices for converting rotary motion to unidirectional motion for propelling a structure in the desired direction of travel.

Referring to FIG. 4, there is illustrated an arrangement for utilizing the propulsion system 10 shown in FIG. 1 to propel in a preselected linear direction a structure generally designated by the numeral 150. The platform 150 is suitably supported for movement on any surface and includes a pair of rotating disks 22 as above described which are positioned on the plates 12 around the shaft assemblies 16. As seen in FIG. 4 the shafts 16 are in spaced relation on opposed sides of the structure 150.

The disks 22 are counter-rotated in the directions indicated by the arrows 152 and 154 in FIG. 4. The respective cams 34 are selectively oriented to position the maximum radial sector in a preselected position to produce a cancellation of the balanced centrifugal forces and generate a resultant linear motion in the direction indicated by the arrow 156. Accordingly, one cam 34 is oriented so that the maximum radial sector is positioned in the eleven o'clock position on the horizontal plane of the structure 150. The other cam 34 is positioned in the one o'clock position on the structure 50 to obtain the desired cancellation of forces.

The respective disks 22 are drivingly connected by a suitable means, such as a belt (not shown), to a drive motor 158 having shaft portions driven in the directions of rotation corresponding to arrows 152 and 154. The resultant effect of the counter-rotating disks 22 is propulsion of the structure 150 in a linear direction along the arrow 156 in a plane perpendicular to the shaft assemblies 16. The magnitude of the linear motion is determined by the volume of the liquid in the reservoirs 42, the size of the pistons 44, the rotational speed of the disks 22, and the weight applied by the load head 76 to the peripheral sector of the cam 34. It should be understood that the disks 22, cams 34, piston rods 40, reservoirs 42, pistons 44, and load heads 76 are identical for both the propulsion apparatus 10 illustrated in FIG. 4. Further the pair of disks 22 and components can be relectively positioned on the structure 150, such as in parallel, in tandem, head to head, in order to achieve the desired direction of travel. The propulsion apparatus 10 can be utilized in any environment and applied to both steering and braking the structure 150.

According to the provisions of the patent statutes, I have explained the principle preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. Apparatus for converting rotary motion to unidirectional motion comprising,
   a platform,
   a shaft having an axis extending perpendicular to the plane of said platform,
   a rotatably driven disk mounted on said shaft below said platform, said disk having a circumferential edge portion,
   a plurality of reservoirs containing liquid, said reservoirs being secured to said disk circumferential edge portion and being equally spaced from one another around said disk circumferential edge portion,
   a piston buoyantly supported in each reservoir and including a piston rod, said piston rod including an end portion extending from said reservoir in a plane perpendicular to the axis of said shaft,
   a cam surrounding said shaft above said platform, said cam having a cam track eccentrically positioned with respect to the axis of said shaft,
   said piston rod end portions being positioned oppositely of said cam track for movement into and out of contact with said cam track upon rotation of said disk about said shaft,
   means for supporting said cam track on said platform for slidable movement in a plane perpendicular to the axis of said shaft,
   a load head positioned above said cam concentric with the axis of said shaft supported by said platform,
   load transmitting means extending from said load head in contact with said cam for exerting a constant force upon said cam in a preselected direction to selectively position said cam on said platform, and
   said piston rods being contacted by said cam track upon rotation of said disk to move said piston rods inwardly and outwardly of said reservoir to move said pistons and to displace the liquid in said reservoirs and generate an unbalanced centrifugal force upon said platform in said preselected direction.

2. Apparatus as set forth in claim 1 which includes,
   guide means for maintaining said cam in a preselected position with respect to said platform for receiving said piston rod end portions on said cam track.

3. Apparatus as set forth in claim 1 which includes,
   said pistons and said piston rods being positioned for reciprocal movement in a plane perpendicular to the axis if said shaft upon rotation of said disk about said cam, and
   means for maintaining said pistons and said piston rods movable in a plane perpendicular to the axis if said shaft.

4. Apparatus as set forth in claim 1 in which,
   said cam track includes a maximum radial sector and a minimum radial sector,
   a shoulder secured to said cam adjacent said cam track, said shoulder extending upwardly from said maximum radial sector, and
   said load transmitting means including an abutment portion in contact with said shoulder for applying a force upon said cam to advance said cam maximum radial sector to a preselected position for engagement with said piston rod end portions upon rotation of said disk.

5. Apparatus as set forth in claim 1 in which,
   said load transmitting means includes a flexible shaft having an upper end and a lower end portion,
   said shaft upper end portion being in contact with said load head so as to receive the force applied by said load head, and
   said shaft lower end portion being positioned in abutting relation with said cam adjacent said cam track for transmitting the force of said load head from said shaft lower end portion to said cam to move said cam to a preselected position for contact of said piston rod end portions with said cam track upon rotation of said disk.

6. Apparatus as set forth in claim 5 in which,
   said shaft upper end portion is concentrically positioned with respect to said shaft being positioned perpendicular to the plane of said platform, and
   said shaft lower end portion being angularly disposed with respect to said shaft upper end portion to transmit the force of said load head to said cam in a plane parallel to the surface of said cam.

7. Apparatus as set forth in claim 1 in which,
   said load head includes a tubular member having an upper end portion positioned concentric with the axis of said shaft supported by said platform,
   a load positioned above said platform for application of a force to said cam,
   said tubular member upper end portion having means for receiving and supporting said load above said platform,
   said tubular member having a lower end portion extending through a slotted portion in said cam and secured to said platform,
   said load transmitting means being positioned in said tubular member upper end portion in bearing relation with said load, and
   said load transmitting means extending laterally from said tubular member between said upper and lower end portions into contact with said cam for transmitting the force of said load to said cam.

8. Apparatus as set forth in claim 1 in which, said load head includes a compression spring exerting a force upon said load transmitting means for transfer to said cam, a receiver for said compression spring mounted above said load transmitting means for housing said compression spring in bearing relation with said load transmitting means, and adjustment means connected to said receiver for controlling the compression of said spring for exerting a preselected spring force upon said load transmitting means.

9. Apparatus as set forth in claim 1 in which, said load head includes a plurality of weighted members, positioned in stacked relation above load transmitting means, and means for supporting said weighted members for movement of each weighted member into load bearing relation with said load transmitting means so as to adjust the total force applied by said weighted members to said load transmitting means.

10. Apparatus as set forth in claim 1 which includes, roller means for movably supporting said cam on said platform to permit lateral movement of said cam relative to the axis of said shaft supported by said platform for selective positioning of said cam track to contact said piston rod end portions.

* * * * *